United States Patent [19]

Zhang

[11] Patent Number: 4,980,630

[45] Date of Patent: Dec. 25, 1990

[54] METHOD AND APPARATUS FOR SPEED REGULATION OF AN ASYNCHRONOUS MOTOR USING STROBE CONTROL

[76] Inventor: Cheng-Hui Zhang, Gang Yan Suo Kung Gang An Ning, Kun Ming City, Yun Nan Province, China

[21] Appl. No.: 153,888

[22] Filed: Feb. 9, 1988

[30] Foreign Application Priority Data

Feb. 23, 1987 [CN] China ................................ 87100946

[51] Int. Cl.[5] ................................................ H02P 5/40
[52] U.S. Cl. ................................................... 318/809
[58] Field of Search ........................... 318/807–811, 318/258, 778, 768, 722, 723

[56] References Cited

U.S. PATENT DOCUMENTS

| | | | |
|---|---|---|---|
| 3,302,090 | 1/1967 | Rayfield | 318/258 |
| 3,668,489 | 6/1972 | Erdmann | |
| 4,060,754 | 11/1977 | Kirtley, Jr. et al. | 318/768 |
| 4,401,933 | 8/1983 | Davy et al. | 318/778 |
| 4,459,532 | 7/1984 | Schutten et al. | 318/808 |
| 4,524,316 | 6/1985 | Brown et al. | 318/812 |

*Primary Examiner*—David Smith, Jr.
*Attorney, Agent, or Firm*—David H. Semmes

[57] ABSTRACT

The present invention relates to method and apparatus for asyncyhronous motor's speed regulation using strobe control, which may be carried out graded or nongraded speed regulation in conventional monospeed squirrel cage motor with simplicity, reliability, cheapness and high efficiency. It provides a notable electricity-saving result with good economical efficiency, especially in asynchronous motors speed regulation of ventillator and water pump driving. The said speed regulation method is using switch 5,6 sequentially to transmit a positive half-wave voltage and a negative half-wave voltage between the input terminals of strating and working windings of asynchronous motor 1, and then, will be repeated above said cycle continuously.

5 Claims, 3 Drawing Sheets

METHOD AND APPARATUS FOR SPEED REGULATION OF AN ASYNCHRONOUS MOTOR USING STROBE CONTROL

BACKGROUND OF THE INVENTION

The present invention relates to speed regulation method and apparatus of an asynchronous motor in order to save electricity.

It has generally been found a number of speed regulation method and apparatus in the prior art of asychronous motor, but none of them has been able to be simple, reliable, cheap and high efficent simutanously, and may be carried out is conventional single speed squirrel cage motor. The controllable speed range is quite narrow, as one third of the normal rotating speed or the less, e.g. disclosure in JP-54-7514.

SUMMARY OF THE INVENTION

A speed regulation method of asynchrouous motor comprises: transmitting a positive half-wave voltage to the input terminals of starting winding of said asychronous motor, using one switch;
then transimitting a negative half-wave voltage to the input terminals of working winding of said asychronous motor, using another swith;
and then after a given time duration being repeated above-mention cycle, continuously.
main circuit including counter phase transformer and monodirectional thyristor and being connected to said a synchronous motor;
controlling means actnating cyclical working mode to transmit positive and negative half-wave voltage being half-wave or a part of monophase alternative power supply to said asynchronous motor with the period T, being 1.5n or 2n (n is a positive integer) times the period of said monophase alternative power supply.

BRIEF DESCRIPTION OF THE INVENTION

It is therefore an object of the present invention to provide a simple apparatus with a wide speed controlling range and notable electricity-saving results, especially in asynchronous motor's speed regulation of water pump and ventilator driving, which has not yet been reached up-to-now in prior art. These and still further objects of the present invention will become reading apparent to one skilled in the art from the following detailed description and drawings, wherein.

FIG. 1 shows the basice scheme of speed regulation method of an asynchronous motor 1 of present invention.

FIG. 2 and 4 are input terminals of strating winding and working winding respectively, and 3 is the common input terminal wherein, while the asychronous motor 1 is a monophase motor; but 2, 3 and 4 are triphase input power supply terminals, while motor 1 is a triphase inductive motor. The controlling operation of speed regulation is as follows:

Switch 5 begins openning after a given time duration in its closed manner, then switch 6 begins openning after a given time duration in its closed manner, and the circuit will periodically be repeated in above-mentioned processing after another given time duration. That is, every cycle using switch 5 and 6 sequentially to transmit a positive half-wave and a negative half-wave voltage between input terminal 2, 4 and 3 of asynchronous motor 1. And then, after a given time duration will be repeated above said cycle. In general cases, the width of negative half-wave, while the cyclical period T (with the unit on second) is equal to the time duration from three to four width of half-wave. Under above-mentioned controlling condition, a rotative displacement magnetic field will be produced in the stator of asychronous motor 1, that will cause the rotator to be rotated. While rotation speed of motor is a little less than 120/PT r.p.m (P is the number of poles of controlled motor 1), there is only a little power consumption within rotator, so that the motor may be worked stablly without speed backfeed condition, that results an efficient and stable speed regulation. Speed regulation may be complated by modifying the period T.

The output power level should not, in general saying, be over $\frac{1}{3}$ to $\frac{1}{2}$ of normal rated power of controlled motor 1, because of the unbalanced power supply to every windings of asychronous motor in present invention. But owing to the proportional relationship existed between shaft horsepower and the 3rd power of rotating speed of ventilator or waterpump, it doesn't need to change original motor for regulating the speed of veatilator or waterpump using present invention in the speed range below 75% of normal rated speed of motor.

The rotating direction of motor 1 using present speed regulation method may be the same as that of motor, which is directly connected 3 phase power supply in sequentially phases to terminals 2, 3, 4 of the same motor. The rotating direction would not be changed, if switch 5 be connected to negative source and switch 6 be connected to positive source, just like disclosed in FIG. 1, but the polarities of power soures wherein are exchanged.

The present apparatus comprising main circuit and electrical elemants, which will complete the same function as switch 5 and 6, is simple and reliable. The present invention has simply overcome the shortcoming, i.e. the large ship power comsumption of conventional asynchronous motor operating below the normal reted rotating speed.

The present invention is suitable for speed regulation of ventilator and water-pump with high electricity-saving efficiency, which has been proved by a lot of experiments, e.g. operating power in $\frac{2}{3}$ graded normal speed will only be 30–40% of normal rated power.

The present invention will now be described in more detail by reference to drawing wherein.

DETAILED DESCRIPTION OF THE INVENTION

The present invention is best more fully descriebed in following embodiments, and the symbol "~" wherein represents the identical monophase alternative power supply.

Figure 4:
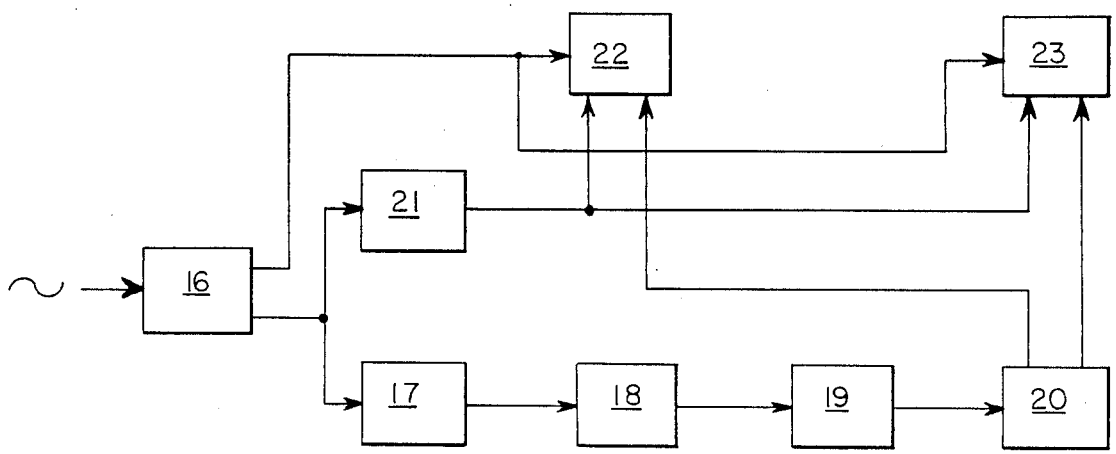
FIG. 4 is the controller for graded speed regulation.

The graded speed regulation being supplied by monophase alternative power supply source is a simple embodiment of present invention. The controller for graded speed regulation of present embodiment is shown in FIG. 4.

Figure 5:
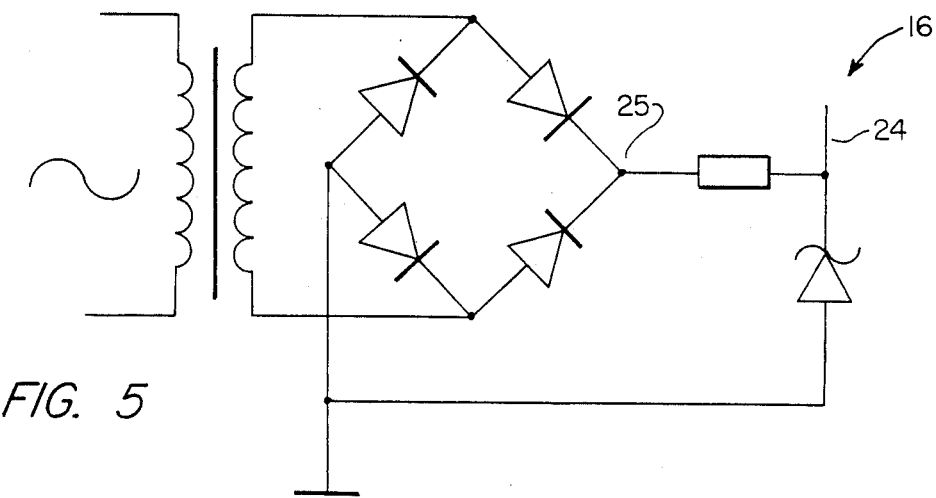
FIG. 5 is the synchronous power supply.
Figure 6:
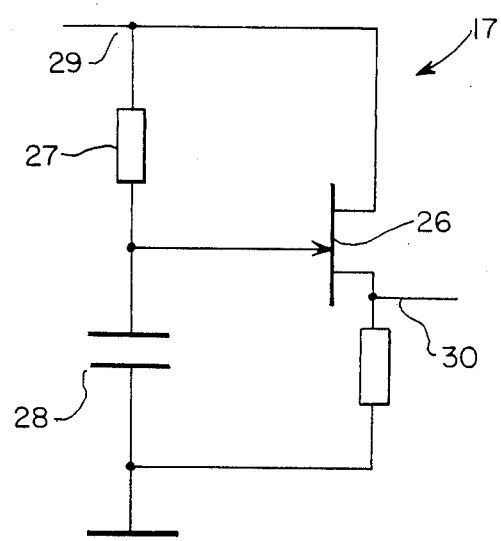
FIG. 6 is the synchronous count impulse generator.
Figure 7:
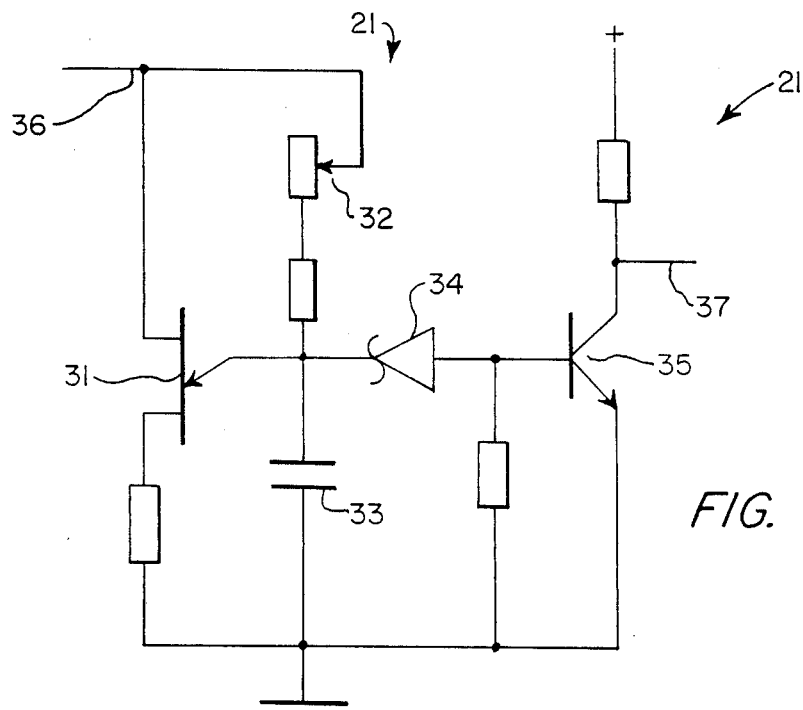
FIG. 7 is the conduction angle controller.

The syrchronous power supply 16 is shown in FIG. 5. The terminal 24 is connected to syncronous count impulse generator 17 and conduction angle controller 21, but terminal 25 is to trigger circuits 22 and 23. The said synchronous count impulse generator 17 of the embodiment is described as the circuit of FIG. 6. Signals from synchronous power supply 16 are sent to terminal 29 and synchronous count impules from terminal 30 are delivered out. By selecting the parameters of resistor 27 and capacitor 28, count impulse generator 17 may produce at the decreasing moment of the half-wave voltage of synchronous power supply 16 only one count impulse, that makes a variable carry system counter 18 actuate. Counter 18 or 19 is a series variable carry system counter with a China-made intergraled circuit in the type C186 wherein. Output of "0" electrical levels from decimal system decorder 20 are delivered to trigger circuit 22, the lower voltage levels whereof are effective. But "1" electrical levels from that are to trigger circuit 23. Conduction angle controller 21 via trigger circuits 22, 23 makes control the conduction angle of controlled thyristors, using the circuit as FIG. 7. Input signals from syrchronous power sypply 16 are fed to 36, and output signals from 37 are delivered to trigger circuits 22, 23, also the lower voltage levels whereof are effective. The parameters of variable resistor 32, resistor, capacitor 33 and zener 34 determine the conductive duration time of transistor 35. Unijunction transistor 31 can make capacitor 33 discharge near the decreasing end of every half-wave volatage signales, transmitted from the synchronous power supply 16. Conduction angle of controlled thyristors may be modified by controlling the value of variable resistor 32.

Figure 1:
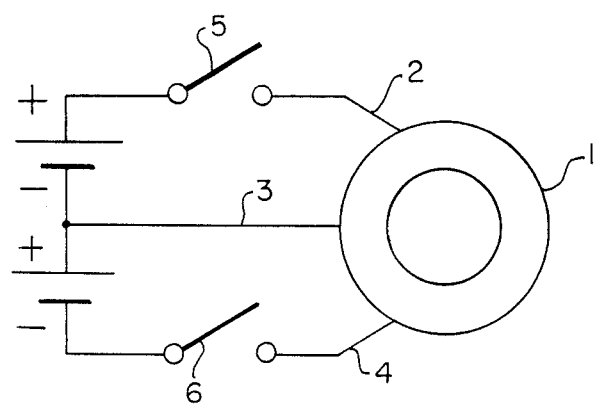
FIG. 1 is the basic schematic illustration of present invention.
Figure 2:
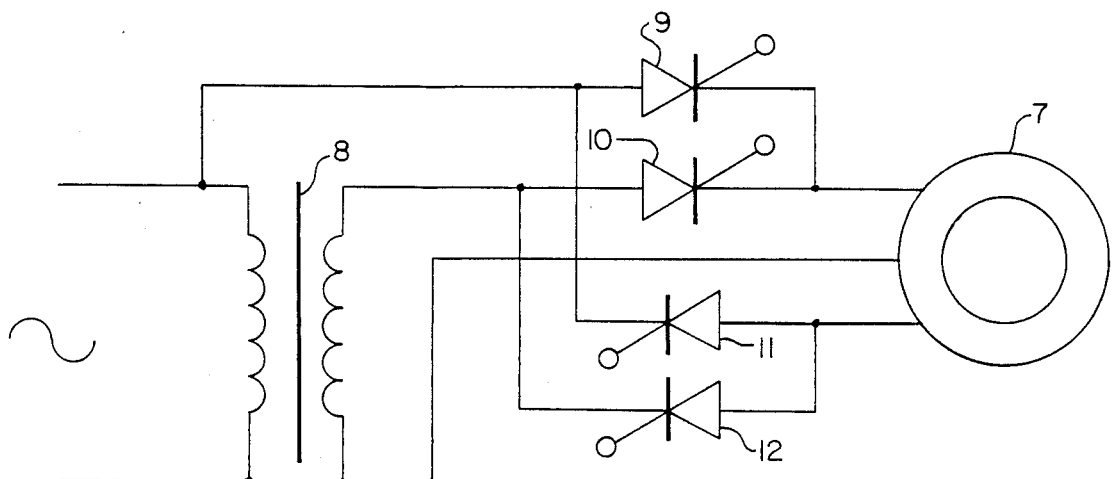
FIG. 2 is the main circuit of graded speed regulation.
Figure 8:
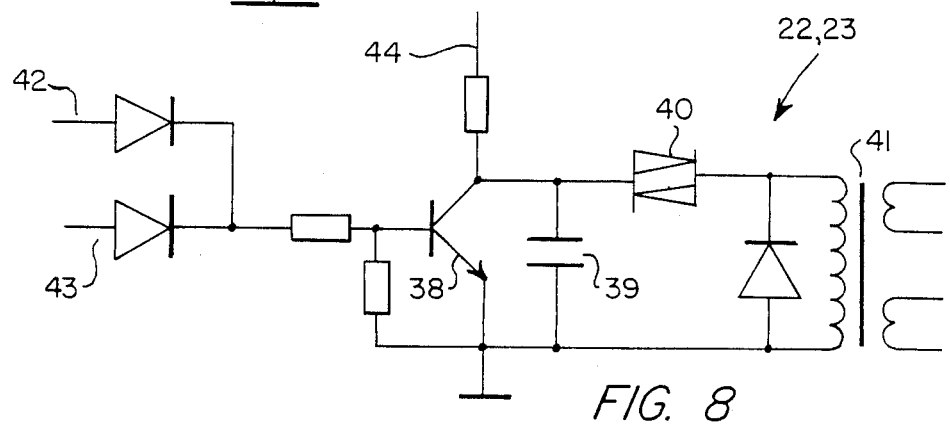
FIG. 8 is the trigger circuit.

The trigger circuit 22 or 23 is the same as shown in FIG. 8. Signals from conduction angle controller 21 are fed to 42. Signals from decorder 20 are fed to 43. Signals from syrchronous power supply 16 are to 44. Output signals of impulse transformer 41 are connected to controlled thyristors. While the voltage levels of 42 and 43 are lower, transistor 38 is blocked. Whereby capacitor 39 is charged to working voltage of bidirectional diode, trigger impulse series will be produced and transimitted from impulse transformer 41. When the output terminals of trigger circuits 22 are connected to the controlling electrodes of monodirectional thyristors 9, and 10 as shown in FIG. 2, the output terminals of trigger 23 circuits are to that of thyristors 11 and 12, the task of graded speed regulation of asynchronous motor is fullfilled, and the aparatus whereby is comprised with the counter phase transformer 8 and the controlled asynchronous motor 7 shown in FIG. 2. The apparatus of graded speed regulation comprises a counter phase transformer 8 and also four conventional monodirectional thyristor 9, 10, 11, 12.

The common input terminal whereof is connected to one terminal of monophase alternative power supply and also to the one terminal of counter-phase transformer 8. Another input terminal of asynchronous motor 7 is via thyristor 9 to monophase alternative power supply source, and also is via thyristor 10 to counter phase terminal of the counterphase transformer 8. Further another input terminal of asynchronus motor 7 is via thristor 11 to said monophase alternative power supply source and also is via thristor 12 said connter phase terminal of the counter phase transformer 8.

Under the condition of variable carry system counter 18 working in n-carry system, n is a positive integer, if n=1, the half-wave voltage output of impulse generator 17 should be fed directly to the varialbe carry system counter 19. Then, if the variable carry system counter 19 is in ternary system manner, the cylical period T of the speed regulator is 1.5n times as long as the period of monophase alternative power supply and $\frac{2}{3}$ n graded speed regulation may be obtained. Otherwise if the variable carry, system counter 19 is in tetranary system manner, the cyclical period T of the speed regulator is 2n times as long as the period of monophase alternative power source, and $\frac{1}{2}$ n graded speed regulation may be obtained.

In summary of above-mentioned examples all the graded speed regulation of $\frac{2}{3}$, $\frac{1}{2}$, $\frac{1}{3}$, $\frac{1}{4}$... are able to be obtained.

In order to start an asynchronous motor using said kind of speed regulator, it is obviously necessary to initiate said motor with switching onto the lowest speed grad and gradually switching up to more high speed grad and until to what is in need of. So that the starting current would not be too large.

The positive or negative half-wave vlotage delivered to controlled motor from speed regulator of present invention is a part or the half-wave of monophase alternative power supply. When working thyristor is to be conducted near π of respective half-wave by controlling the variable resistor 32 in conduction angle controller 21 to lowest, and when load power of asychronous motor is to be adapted to Δ−Y exchangable or transsfromed power supply by a transfrom, the influences of harmonic componeuts may considerably be decreased.

Figure 3:
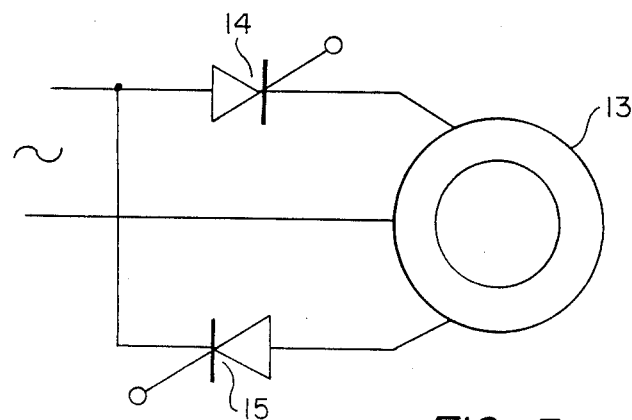
FIG. 3 is the main circuit of $\frac{1}{2}$ graded speed regulation.
Figure 9:
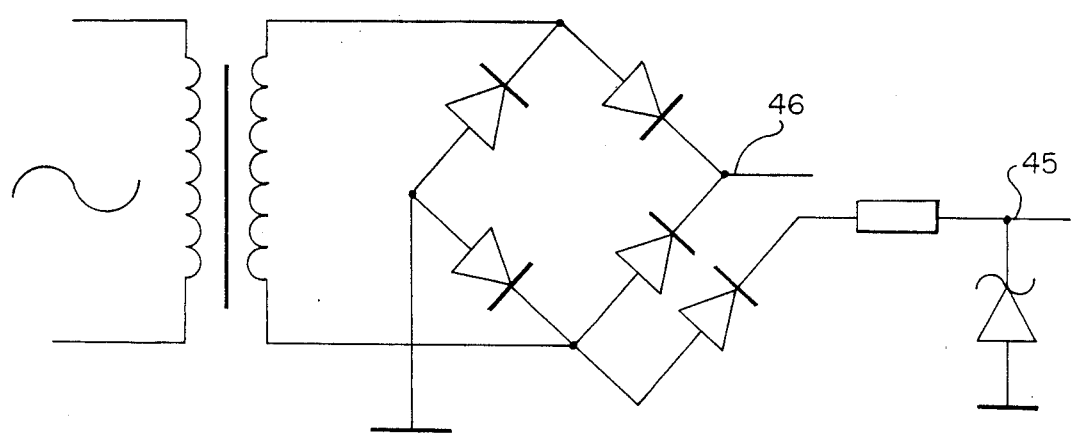
FIG. 9 is the synchronous power supply for $\frac{1}{2}$ graded speed regulation.

Another most simple embodiment of present invention, using $\frac{1}{2}$ graded speed regulation with monophase alternative power supply is described as follows: Having cancelled 18, 20, 23 out from FIG. 4, having changed 19 to a binary system counter, which is, directly connected to 17 wherein, output signals by that said binary system counter are fed to 22. Output signals of trigger circuit 22 are fed to the controlling electrodes of monodirectional thyristor 14 and 15 in FIG. 3. Synchronous power supply circuit 16 should be just like the schematic diagram of the FIG. 9. Signals from 45 are fed to synchronous count impulse generator 17. Having cancelled conduction angle controller 21, output signals 46 are fed to trigger circuit 22.

For avoiding the trouble of starting a $\frac{1}{2}$ graded speed regulator, asynchronous motor may be started by the help of 3 phase alternative power source, and then switched onto the said speed graded regulator afterwards. The attention ought to be paid to asychronous impact, which would be probably happened at the moment of switching. That problem may be solved by following procedures: switching with a time delay to speed regulator; restricting the current of main circuit; keeping the untriggered mode of the thyristors in main circuit until synchronism; keeping stop-count or skipcount of the counter in said controller during the period of asynchronoism.

Consequeutly the $\frac{1}{2}$ graded speed regulation apparatus comprising main circuit with 2 monodirectional thyristor 14, 15 may regulate the speed of asynchronous motor 13, having cyclical period being 2 times as long as the period of monophase alternative power supply by the help of controller.

It will understood by those skilled in the art that the foregoing description in the terms of a preferred embodiment of present invention wherein various changes and modifications may be made without departing from the spirit and scope of the invention, as set forth in the appended claims.

What is claimed is:

1. An asynchronous motor 7 having first, second and third input terminals 2, 3, 4 in combination with a speed regulation apparatus for said motor, adapted to conserve electricity of a power supply comprising:
   (A) an A.C. power source 16;
   (B) a main circuit connected to the power source 16, including in operative connection:
      (B1) a phase reversal transformer 8;
      (B2) first and second pairs of thyristors, 9, 10, and 11, 12, disposed in opposite polarity relative to each other;
      (B3) a conduction angle controller 21 and;
      (B4) a motor 7, connected to a primary winding of phase reversal transformer 8, said motor 7 being likewise connected to A.C. power source 16, respective cathodes of said first pair of thyristors 9, 10 being connected to first input terminal 2 of motor 7, an anode of thyristor 9 of said first pair of thyristors being connected to one terminal of the primary winding of the phase-reversal transformer 8, an anode of thyristor 10 of said first pair of thyristors being connected to secondary winding of phase-reversal transformer 8, respective anodes of said second pair of thyristors 11, 12 being connected to third input terminal 4 of motor 7, the cathode of thyristor 11 of said second pair of thyristors being connected to the anode of thyristor 9 of the first pair of thyristors, the cathode of thyristor 12 of the second pair of thyristors being connected to the anode of thyristor 10 of the first pair of thyristors, one terminal each of primary and secondary windings of said transformer 8 being respectively connected to the second input terminal 3 of motor 7, the control terminals of each of thyristors 9, 10, and 11, 12 being connected to output terminals of said controller 21.

2. The combination according to claim 1, wherein the controller in interconnection comprises a synchronous power source 16, pulse generator for synchronous counting 17, conduction angle controller 21, trigger circuits 22 and 23 variable scale counters 18 and 19, decimal decoder 20; the input terminal of the synchronous power source 16 being connected to A.C. power source, and wherein one of two output terminals of synchronous power source 16 is connected to one input terminal of pulse generator for synchronous counting 17 and one input terminal for conduction angle controller 21 separately, the second output terminal of the synchronous power source 16 being connected separately to one of three input terminals of each trigger circuit 22 and 23, which are comprised of: two terminals 42 and 43 receiving signals from conduction angle controller 21 and decoder 20, respectively, terminal 44 fed by power supply 16, the output signal of impulse transformer 41 connected to controlled thyristors, transistor 38 which is blocked at low voltage levels in 42 and 43, capacitor 39 charged to working voltage of bilateral diode 40 that produces a trigger pulse transmitted from impulse transformer 41; the output terminal of pulse generator for synchronous counting 17 being connected to the input terminal of the variable scale counter 18, output terminal of said variable scale counter 18 being connected to the input terminal of the variable scale counter 19, the output terminal of the variable scale counter 19 being likewise connected to the input terminal of the decimal decoder 20, one of two output terminals of said decimal decoder 20 being connected to one input terminal of the trigger circuit 22, the second output terminal of the decoder 20 being connected to one input terminal of the trigger circuit 23, the output terminal of conduction angle controller 21 being connected separately to one input terminal of each trigger circuit 22 and 23.

3. The combination according to claim 1, wherein the pulse generator for synchronous counting 17 includes in interconnection unijunction transistor 26, capacitor 28 and at least two resistors therebetween.

4. The combination according to claim 1, wherein the conduction angle controller 21 includes in interconnection unijunction transistor 31, transistor 35, zener 34, variable resistor 32, capacitor 33 and resistors, therebetween.

5. The combination according to claim 1, wherein trigger circuits 22, 23, comprise in interconnection transistor 38, bilateral diode 40, capacitor 39, pulse transformer 41 and diodes as well as resistors.

* * * * *